United States Patent

[11] 3,601,678

[72] Inventors Dennis G. Abraham
 Vestal;
 George J. Dohanich, Binghamton; Joseph
 P. Pawletko, Endwell, all of, N.Y.
[21] Appl. No. 41,032
[22] Filed May 27, 1970
[45] Patented Aug. 24, 1971
[73] Assignee International Business Machines
 Corporation
 Armonk, N.Y.

[54] STEPPING MOTOR CONSTANT VELOCITY DRIVE
 INCLUDING CLOSED AND OPEN LOOP CONTROL
 9 Claims, 12 Drawing Figs.
[52] U.S. Cl. .................................................... 318/685,
 318/254, 318/696
[51] Int. Cl. .................................................... G05b 19/40
[50] Field of Search ......................................... 318/696,
 685, 254, 138, 415

[56] References Cited
 UNITED STATES PATENTS
3,488,566 1/1970 Fukuda .......................... 318/254 X
3,518,516 6/1970 Pawletko ....................... 318/138

Primary Examiner—G. R. Simmons
Attorney—Sughrue, Rothwell, Mion, Zinn & Macpeak

ABSTRACT: A stepping motor drive which includes both a closed loop feedback control system and an open loop oscillator control system. The stepping motor is started by a start pulse, and feedback pulses from an emitter driven by the motor are gated to accelerate the motor. At the same time, the feedback pulses are gated to reset and synchronize a free-running oscillator. Feedback and oscillator pulses are compared, and when synchronism is achieved, i.e., the motor is up to speed, the oscillator pulse gate drive is enabled. When this occurs, the oscillator is controlled by a discriminator which compares the phase of the oscillator and feedback pulses and corrects the relation therebetween by modifying the oscillator frequency.

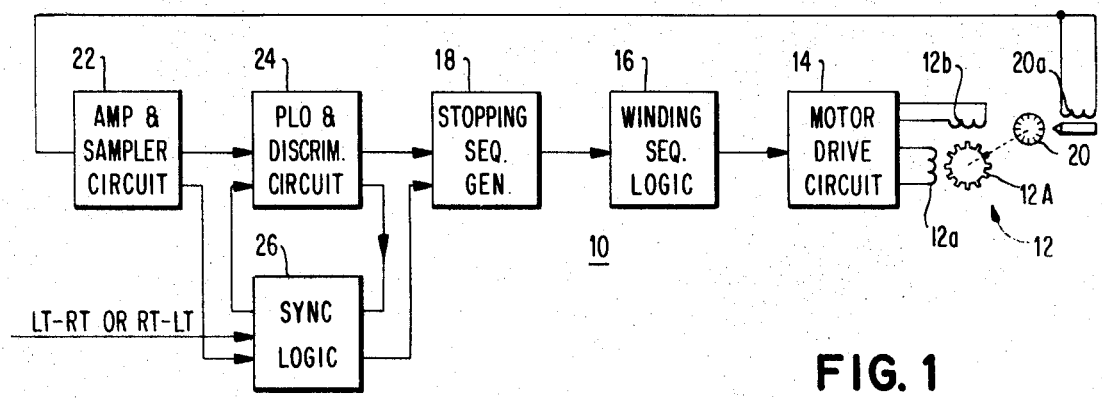
FIG. 1
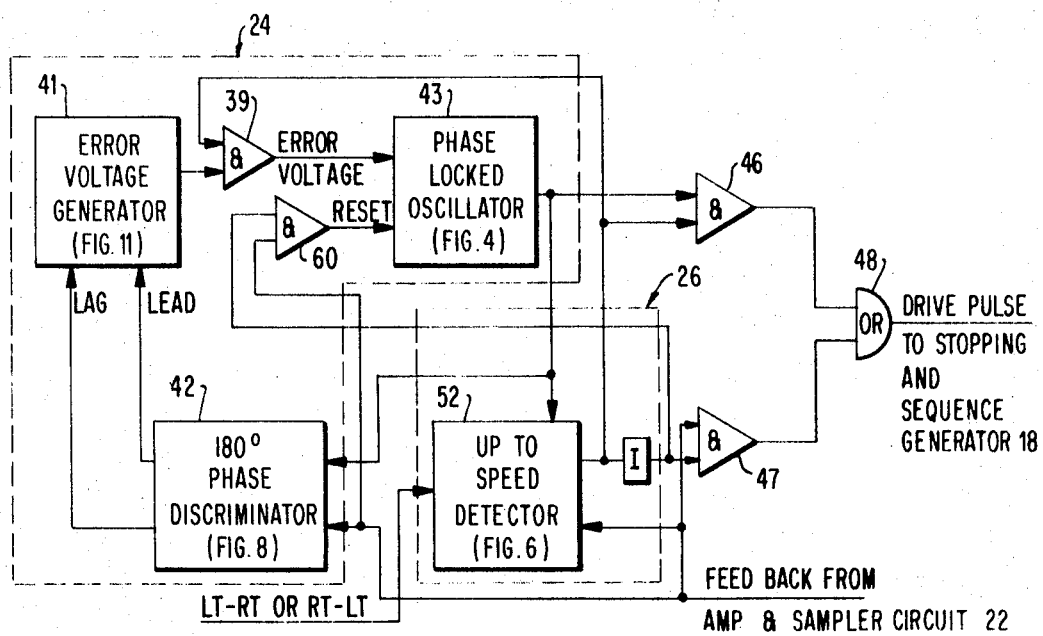
FIG. 2
FIG. 3
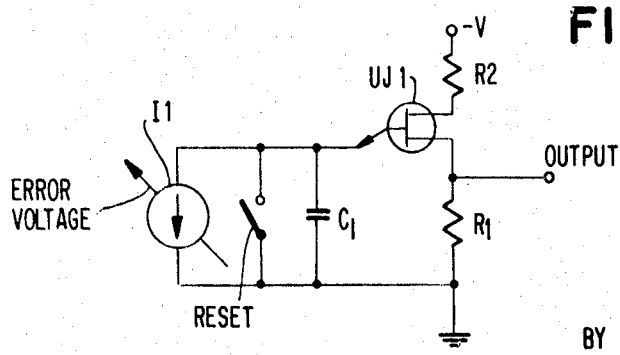
INVENTORS
DENNIS G. ABRAHAM
GEORGE J. DOHANICH
JOSEPH P. PAWLETKO
BY Sughrue, Rothwell, Mion, Zinn & Macpeak
ATTORNEYS 3,601,678

STEPPING MOTOR CONSTANT VELOCITY DRIVE INCLUDING CLOSED AND OPEN LOOP CONTROL

CROSS-REFERENCE TO RELATED APPLICATIONS

This application is directed to improvements in the system disclosed in a patent application entitled "Stepping Motor Constant Velocity Drive", Ser. No. 693,366, filed Dec. 26, 1967 by Joseph P. Pawletko and now U.S. Pat. No. 3,518,516-B and assigned to the assignee of the present application.

BACKGROUND OF THE INVENTION

1. Field of the Invention

The present invention generally relates to motor control circuits, and more particularly to improvements in a constant velocity drive for a stepping motor.

2. Description of the Prior Art

Stepping motor control circuits are known wherein either closed loop feedback control is used or an open loop oscillator control is used to start and run the stepping motor. The closed loop feedback control has the particular advantage of rapidly accelerating the stepping motor to the desired running velocity. This type of control, however, has not proved to be entirely satisfactory for running a stepping motor at an accurately controlled stepping rate. The open loop oscillator control is better suited to run a stepping motor at fixed stepping rates, but is not capable of rapidly accelerating the stepping motor to running velocity.

The above-identified Pawletko application Ser. No. 693,366, now U.S. Pat. No. 3,518,516-B describes a system for starting a stepping motor with a closed loop feedback control circuit and thereafter transferring it to an open loop oscillator control circuit when it reaches speed. This control circuit uses feedback pulses from a stepping motor emitter for accelerating the stepping motor and resetting a free-running oscillator to synchronize the oscillator with the feedback pulses. When the motor is up to speed, motor control is transferred from the feedback pulses to the oscillator pulses. Basically, the circuit comprises an emitter driven by the motor which generates feedback pulses that are gated by the output of an Up-to-Speed latch to accelerate the motor. At the same time, the feedback pulses are gated to reset and synchronize a free-running oscillator. Feedback and oscillator pulses are applied to a pair of latches for resetting the Up-to-Speed latch when the motor is up to speed. This blocks the feedback pulse gate and enables the oscillator pulse gate drive. When this occurs, a discriminator is enabled which compares the phase of the oscillator and feedback pulses and corrects the relation therebetween by modifying the oscillator frequency. A stop signal blocks the normal drive pulses and times a stopping sequence of a predetermined train of stopping pulses to bring the stepping motor to rest.

SUMMARY OF THE INVENTION

It is generally an object of the present invention to provide improvements in the constant velocity stepping motor drive circuit disclosed in the Pawletko application, Ser. No. 693,366 and now Pat. No. 3,518,516.

More specifically, it is an object of this invention to provide an improvement in the phase-locked oscillator circuit of a stepping motor drive whereby all of the oscillator intervals are equal.

It is another object of the invention to provide an improved Up-to-Speed Detector in a stepping motor drive which is not symmetry dependent.

It is also an object of this invention to provide a digital phase discriminator for controlling a phase-locked oscillator circuit in a constant velocity stepping motor drive.

It is yet another object of the invention to provide an improved error voltage generator which is capable of translating the signals from a 180° phase discriminator into a signal usable by a phase-locked oscillator.

According to the present invention, the foregoing and other objects are attained by providing an improved reset circuit in a phase-locked oscillator. The phase-locked oscillator is preferably a relaxation oscillator including a unijunction transistor and a current source used to charge a capacitor. A reset transistor is connected across the capacitor to discharge the same for the purpose of synchronizing the oscillator. A diode is connected in the emitter circuit of the reset transistor and is chosen such that the sum of the voltage drop across the collector and emitter of the reset transistor plus the voltage drop across the diode is approximately equal to the valley voltage of the unijunction transistor. An Up-to-Speed Detector is provided which includes an Up-to-Spped trigger which is conditioned by a pretrigger. The Up-to-Speed trigger is reset by the motor starting pulse. In the reset condition, the Up-to-Speed trigger gates feedback pulses to drive the stepping motor. The Up-to-Speed trigger is set when a positive going edge of a feedback pulse comes before the pretrigger is reset by the positive going edge of the phase-locked oscillator binary pulse. When the Up-to-Speed trigger is set, the stepping motor runs on the oscillator output. When this occurs, the frequency of the oscillator is modulated by an error voltage. A 180° phase discriminator and error voltage generator are used to generate this error voltage. The operation of the system under the open loop oscillator control condition is to minimize the phase error of the system to be equivalent to one feedback pulse.

BRIEF DESCRIPTION OF THE DRAWINGS

FIG. 1 is a schematic block diagram of a stepping motor control system embodying the invention;

FIG. 2 is a block diagram of the improved phase-locked oscillator loop for the stepping motor drive according to the invention;

FIG. 3 is a simplified schematic diagram of the phase-locked oscillator which illustrates the principles of its operation;

DESCRIPTION OF THE PREFERRED EMBODIMENT

Figure 6:
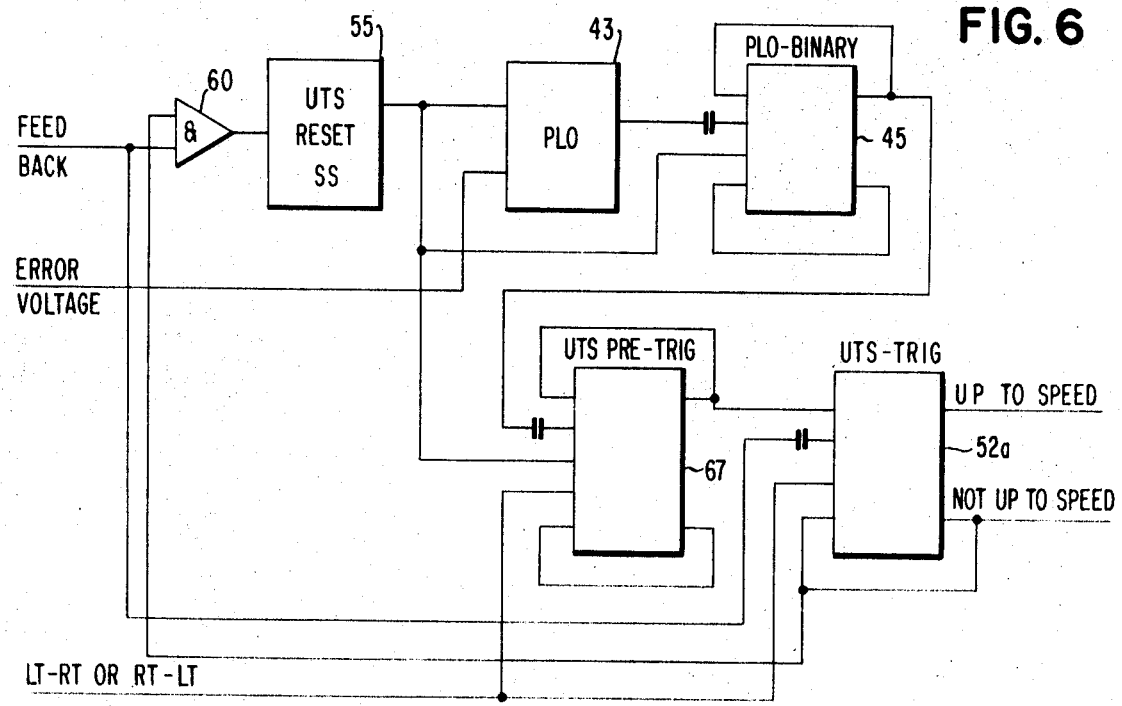
FIG. 6 is a block diagram of the improved Up-to-Speed Detector according to the invention.

Referring now to the drawings wherein like reference numerals designate similar or corresponding elements throughout the several figures, and more particularly to FIG. 1 of the drawings, the reference numeral 10 denotes generally a stepping motor control system for a stepping motor 12 having phase related windings 12a and 12b for effecting rotation of a multitoothed armature or rotor 12A in a step-by-step sequence in response to an LT-RT or RT-LT initiating signal for driving a movable element such as a type bar (not shown) or the like. The stepping motor 12 may be of any suitable type, being for example, of the type described in the article entitled "Characteristics of a Synchronous Inductor Motor" by Arthur E. Snodon and Elmer W. Madson, published in "Applications and Industry", March, 1962, being the subject of paper 61–650 recommended by the AIEE Industrial Control Committee, and approved by the AIEE Technical Operations Department for presentation at the AIEE Northeastern District Meeting, Hartford, Connecticut, May 17-19, 1961.

As shown, the windings 12a and 12b of the motor are energized from a motor drive circuit 14 of a suitable type, which may be energized through Winding Sequence Logic 16 comprising a well-known arrangement of binary triggers. A Stopping Sequence Generator 18 is connected to the Winding Sequence Logic 16 to assure the best deceleration and critically damped stopping necessary for good performance of the motor. The details of the Stopping Sequence Generator are disclosed in the above-identified Pawletko application Ser. No. 693,366. Operation of the motor is effected generally during acceleration by means of feedback pulses from emitter 20, driven by the motor 12, and an associated emitter read head 20a connected to an Amplifier and Sampler Circuit 22 which in turn is connected to the motor drive circuits 14 through the Stopping Sequence Generator 18 and Winding Sequence Logic 16. A Phase-Locked Oscillator and Discriminator Circuit 24 is provided for operation under control of the feedback pulses from the emitter 20, and under control of the Synchronizing Logic 26, for operating the motor 12 when it has come up to speed.

The system described thus far with respect to FIG. 1 is common to both the Pawletko application Ser. No. 693,366, and the present invention. FIG. 2 illustrates, in block diagram form, the improved Phase-locked Oscillator and Discriminator Circuit 24 and Synchronizing Logic 26 according to the present invention. The phase-locked oscillator loop shown in FIG. 2 may be divided into four basic sections:

1. the Phase-Locked Oscillator (PLO) 43;
2. the Up-to-Speed Detector (UTS) 52;
3. the 180 Phase Discriminator (PD) 42; and
4 l . the Error Voltage Generator (EVG) 41. Each of these sections and the improvements over the earlier PLO techniques of the pending Pawletko application will be described in more detail hereinafter.

Operation of the system is started by applying an LT-RT or RT-LT pulse to the UTS 52. This acts to reset the UTS trigger 52a (FIG. 6). Under these conditions, the logical inversion of the outputs of the UTS trigger 52a enables AND gate 47. The feedback pulses from Amplifier and Sampler Circuit 22 are then gated by AND gate 47 through OR gate 48 to provide the drive pulses to Stopping and Sequence Generator 18. The output from PLO 43 is compared with the feedback pulses by UTS 52, and when the period of the feedback pulses equals the period of the oscillator, the UTS trigger 51a is set thereby blocking AND gate 47 and enabling AND gate 46. When this occurs, the output of PLO 43 is gated by AND gate 46 through OR gate 48 to provide the drive pulses to Stopping and Sequence Generator 18.

During the time that the UTS trigger 51a is in the reset condition, AND gate 60 is enabled and acts to gate feedback pulses to reset the PLO 43. When the stepping motor has come up to speed and the UTS trigger has been set, AND gate 60 is blocked and AND gate 39 is enabled. AND gate 39 is an AC gate which connects the outputs error voltage from EVG 41 to the PLO 43. This error voltage is used to correct the phase relation between the oscillator and feedback pulses.

The oscillator and feedback pulses are compared by the PD 42 which provides two binary-coded outputs. These outputs are designated as LAG and LEAD. A binary 1 and 0, respectively, appearing on these leads indicates that the oscillator lags the feedback pulses; a binary 0 and 1, respectively, indicates that the oscillator leads the feedback pulses. A binary 0 appearing on both the LAG and LEAD outputs of PD 42 indicates that the oscillator and feedback pulses are in phase. A binary 1 appearing on both outputs is an impossible condition. The two outputs from PD 42 are used by the EVG 41 to generate an appropriate error voltage signal which is used to modulate the frequency of the PLO 43.

Figure 5:
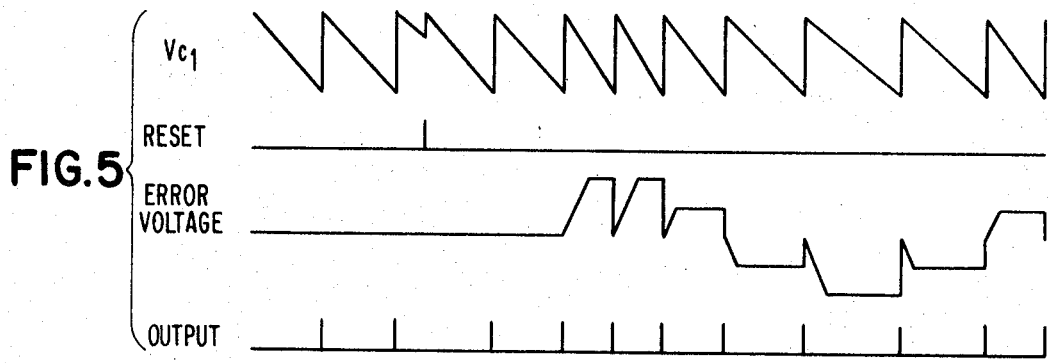
FIG. 5 is a timing diagram useful in understanding the operation of the circuits shown in FIGS. 3 and 4.

FIG. 3 shows a simplified schematic diagram of the PLO 24 used in the system according to the invention. A variable "-constant current" source I1 is used to charge capacitor C1 to a negative voltage. A Complementary Unijunction Transistor UJ1 is connected from the negative terminal of a regulated voltage source $-V$ through resistors R2 and R1 to ground. The capacitor C1 is connected between the emitter of UJ1 and ground. When the voltage across C1 ($V_{C1}$) reaches the firing value of UJ1, UJ1 conducts and discharges C1 to its valley voltage to develop an output pulse across R1. The cycle then repeats itself as indicated in FIG. 5.

The frequency of the oscillator is controlled by varying the value of the current source I1. The error voltage is used to modulate this current source as will be explained in more detail in a later portion of this specification. In addition, a reset function is provided to discharge the capacitor C1 to ground prior to $V_{C1}$ reaching the firing voltage of UJ1. This reset function is used to synchronize the oscillator to the feedback.

Figure 4:
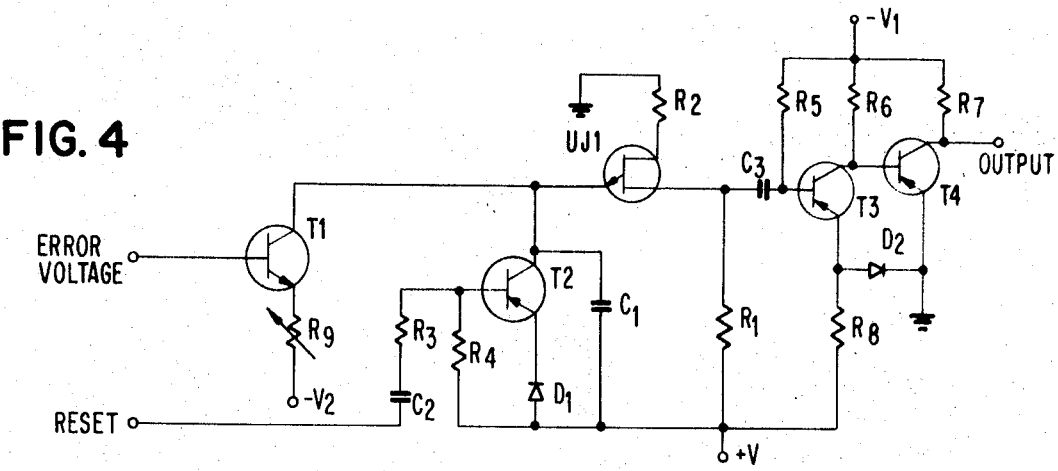
FIG. 4 is a detailed schematic diagram of the phase-locked oscillator.

FIG. 4 shows a detailed schematic diagram of one implementation of the oscillator shown in FIG. 3. The current source I1 consists of an NPN transistor T1 and a variable resistor R9. Resistor R9 is connected between the emitter of transistor T1 and the negative terminal $-V_2$ of the regulated voltage source and is used to set the initial frequency of the PLO. The error voltage is applied to the base of transistor T1 in order to modulate its collector to emitter current. The collector of transistor T1 is connected to the capacitor C1, so that modulating the value of the T1 collector current determines the rate of charge of capacitor C1 and therefore the frequency of the PLO.

The reset function is provided by PNP reset transistor T2. The collector of transistor T2 is connected in common with the collector of transistor T1 to one side of capacitor C1. The other side of capacitor C1 is connected to the positive terminal $+V$ of the regulated voltage source. The anode of a diode D1 is also connected to this positive terminal, and the cathode of diode D1 is connected to the emitter of transistor T2. The base of transistor T2 is connected through a bias resistor R4 to the positive terminal of the regulated voltage source. The reset signal is applied through the series connection of capacitor C2 and resistor R3 to the base of transistor T2.

The circuit just described performs a single shot function in response to a negative going input signal. Transistor T2 turns on and discharges C1 to $V_{CE2}$ plus $V_{D1}$, where $V_{CE2}$ is the collector-to-emitter voltage drop of transistor T2. The diode D1 is chosen such that $V_{CE2}$ plus $V_{D1}$ is approximately equal to the valley voltage of unijunction transistor UJ1. This insures that all oscillator intervals will be equal. Without the diode D1, the first oscillator interval would be longer than all the rest since the current source I1 must charge capacitor C1 for a longer period of time to reach the firing voltage of unijunction transistor UJ1. Thus, this diode D1 is an improvement over the PLO described in the pending Pawletko application.

Transistors T3 and T4 along with their associated resistors R5, R6, R7, and R8 and the coupling capacitor C3 provide shaping, level translation and drive. The diode D2 connected between the emitters of transistors T3 and T4 provides a voltage drop equivalent to the base-emitter diode drop of transistor T4. Since $V_{CE3}$ is lower than $V_{BE4}$, this assures a holdoff condition on transistor T4.

Operation of the PLO may be better appreciated with reference to FIG. 5. The uppermost part of the FIGURE illustrates the charging cycle of the capacitor C1. It is assumed that during the time represented by the left-hand portion of the FIGURE, the stepping motor has not yet come up to speed. Under these conditions, the feedback pulses from the emitter driven by the stepping motor act to reset the PLO in order to synchronize the PLO. This is illustrated by the reset pulse which causes the capacitor C1 to be discharged. Shortly thereafter, the motor is assumed to have reached running speed, and the error voltage then controls the frequency of the PLO.

As previously described, the UTS 52 is used to determine the point at which the motor has accelerated to the oscillator center frequency, to synchronize the oscillator to the feedback and to transfer control of the motor from the feedback to the phase-locked oscillator. A block diagram of the UTS 52 is shown in FIG. 6. The UTS trigger 52a is reset by the LT-RT or RT-LT start pulse. In this condition, the UTS trigger 52a enables AND gate 60 which gates the feedback pulses to the UTS reset single shot 55. The UTS reset single shot is driven by the positive edge of the feedback signal if the UTS trigger 53 has not been set. The UTS reset single shot 55 resets the PLO 43 and the PLO binary 45 and sets the UTS pretrigger 67. The reset pulse width, that is, the output of the UTS reset single shot 55, is made narrow so as not to modulate the frequency or phase of the PLO 43. The UTS pretrigger 67 is reset by the first positive going edge of the PLO binary 45, or after two oscillator pulses. The UTS trigger 52a will be set if a positive going edge of the feedback signal comes before the pretrigger is reset by the positive going edge of the output of the PLO binary 45. In other words, the UTS trigger 52a will be set if the feedback frequency is greater than the oscillator frequency. When UTS trigger 52a is set, the output from AND gate 60 is blocked with the result that the reset generated by the UTS reset single shot 55 disappears. With the disappearance of the reset, the PLO 43 is in its phase locked mode.

Figure 7:
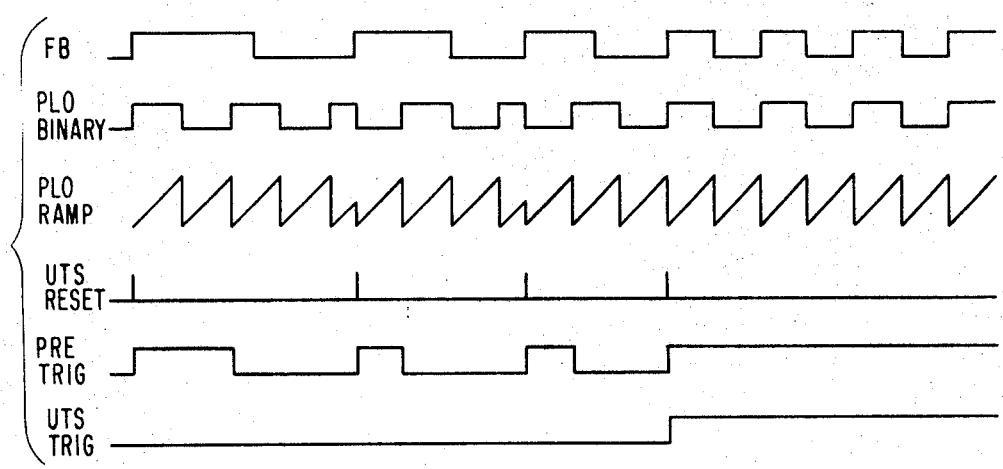
FIG. 7 is a timing diagram illustrating the operation of the Up-to-Speed Detector shown in FIG. 6.

FIG. 7 shows the timing diagrams for the Up-to-Speed Detector shown in FIG. 6. The PLO ramp is, of course, the inversion of the charging cycle of the capacitor C1. The PLO binary 45 is triggered at each negative going edge of the PLO ramp. The UTS reset pulse is generated at the positive going edge of the feedback signal by the UTS reset single shot 55. This reset pulse sets the pretrigger 67. The pretrigger 67 is then reset by the positive going edge of an output pulse from the PLO binary 45. When the positive going edge of the feedback signal occurs before or simultaneously with the positive going edge of an output pulse from the PLO binary the UTS trigger 52a is set thereby blocking further reset pulses.

Thus, it may be seen that each feedback pulse acts to reset the oscillator if the UTS trigger 52a has not been set. Since the oscillator and feedback always "start" at the same time, synchronization of the oscillator to the feedback is achieved. When the UTS trigger 52a is set, the reset single shot 55 is blocked and the motor then runs on the oscillator output. The phase discriminator and error voltage generator then generates an error voltage which is used to modulate the frequency of the oscillator. The principal advantage of the Up-to-Speed Detector according to the present invention is that it is not symmetry dependent.

Figure 8:
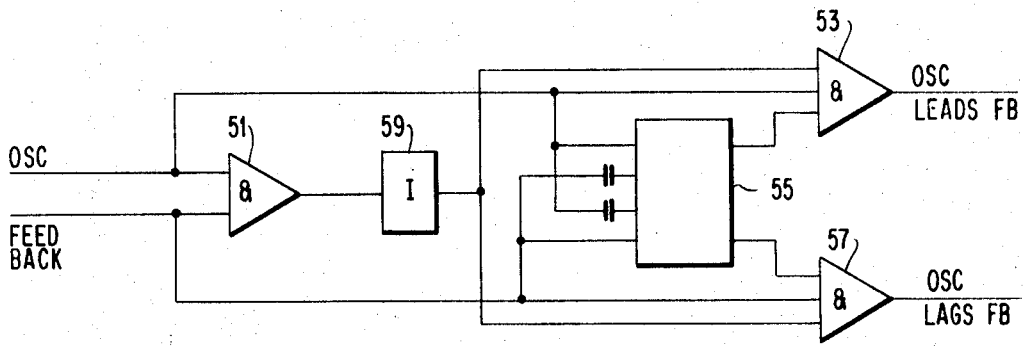
FIG. 8 is a block diagram of the 180° phase discriminator according to the invention.

The operation of the 180° Phase Discriminator shown in FIG. 8 depends on the phase, i.e., LEAD or LAG, of the feedback signal in relation to the output of the oscillator. The oscillator and feedback signals are each applied to respective inputs of AND gate 51. The oscillator signal is also applied to one input of an AND gate 53 and as an enabling input to one side of a trigger 55. In a similar manner, the feedback signal is also applied as one input to an AND gate 57 and as an enabling input to the other side of the trigger 55. The feedback signal is also connected to the trigger input on the side of the trigger enabled by the oscillator signal. Similarly, the oscillator Signal is connected to the trigger input on the side of the trigger enabled by the feedback signal. The outputs of the trigger 55 are respectively connected to inputs of the AND gates 53 and 57. The output of AND gate 51 is inverted by inverter 59 which has its output connected to inputs of both of AND gates 53 and 57.

There are three cases which will be detected by the discriminator:

1. The feedback signal lags the oscillator signal;
2. The feedback signal leads the oscillator signal; and
3. The feedback signal and the oscillator signal are in phase.

In case 1, that is the feedback signal lags the oscillator signal, the oscillator signal conditions the trigger 55. A positive transition of the feedback pulse sets the trigger to its binary 1 state. When the oscillator signal is positive and there is no coincidence with the feedback signal, AND gate 51 produces a zero output. This output is inverted by inverter 59 to provide a one level at AND gate 53, resulting in a positive output which indicates that the oscillator leads the feedback. The arrival of a feedback pulse results in a change in level at AND gates 51 and 53, causing a binary zero output at AND gate 53. The state of the trigger 55 cannot change since the enabling signal from the oscillator remains positive.

In the second case where the feedback signal leads the oscillator signal, the trigger 55 will be enabled to permit a positive-going pulse from the oscillator signal to set the trigger to its binary zero state. This results in a binary 1 output at AND gate 57 which indicates that the oscillator lags the feedback signal. In both of these cases, the phase discrepancy between the feedback and oscillator signal determines the width of the output of one or the other of AND gates 53 and 57. The outputs of these two AND gates go to the error voltage generator to be described in more detail below.

Finally, in the case where the oscillator signal and the feedback signal are in phase, AND gate 51 will produce a binary one output which in turn is inverted by inverter 59 to block the outputs of both of AND gates 53 and 57. It may, therefore, be appreciated that the 180° Phase Discriminator is a digital phase discriminator which is not symmetry dependent. Thus, the discriminator employed in the present invention does not require near perfect symmetry for proper operation.

Figure 9:
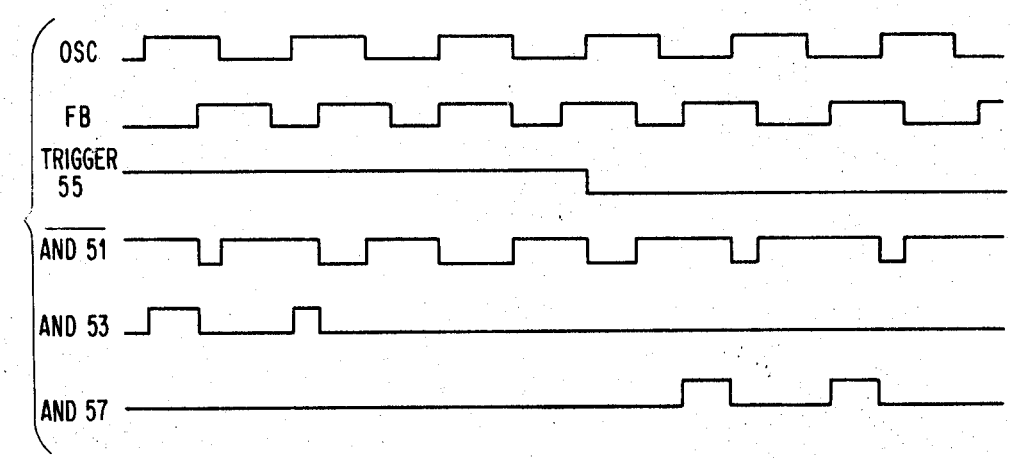
FIG. 9 is a timing diagram which illustrates the phase discriminator operation.

FIG. 9 of the drawings illustrates by way of example the operation of the 180° Phase Discriminator shown in FIG. 8 wherein it is assumed that the oscillator leads the feedback signal to begin with but, as phase correction takes place, the feedback signal starts to lead the oscillator signal. During the time that the oscillator signal leads the feedback signal, the trigger 55 is set in its binary 1 state. Trigger 55 remains in this state as long as the oscillator signal leads the feedback signal. AND gate 53 produces an output which commences with the positive going edge of the oscillator signal. This output is then terminated by the negative going output of inverter 59 which occurs at the coincidence of the oscillator and feedback signals. When the feedback signal leads the oscillator signal, the trigger 55 is switched to its binary 0 state by the next following positive-going edge of the oscillator signal. Trigger 55 will then remain in this condition as long as the feedback signal leads the oscillator signal. During this time, AND gate 57 produces an output which commences with the positive-going edge of the feedback pulse and is terminated by the coincidence of both the oscillator and feedback signals.

Figure 10:
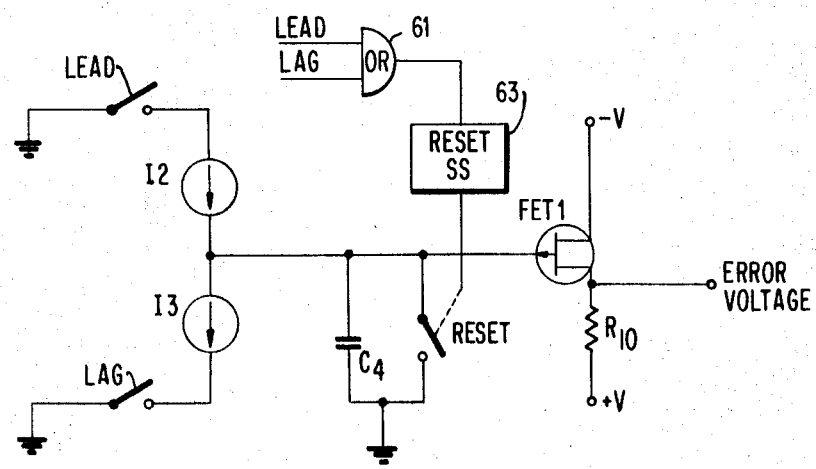
FIG. 10 is a simplified block and schematic diagram of the error voltage generator according to the invention.

The error voltage generator shown in simplified form in FIG. 10 is used to translate the signal from the 180° Phase Discriminator into a signal usable by the PLO. Two current sources I2 and I3 are used to charge or discharge a capacitor C4 to a voltage centered around some reference. In the illustrated circuit, ground voltage level is used as the reference. The capacitor voltage is reset to ground or the center reference value each time the voltage is to be modified as indicated by a lead or lag signal from the discriminator. This is accomplished by applying the outputs of both AND gates 53 and 57 to OR gate 61. The output of OR gate 61 triggers a reset single shot 63 which causes capacitor C4 to be discharged.

If a lead signal is present, current source I2 is turned on for the duration of the lead signal and charges capacitor C4 to some value. This voltage is monitored by a source follower circuit comprising a field effect transistor FET1 and its load resistor R10. This error voltage is applied to the PLO to modulate its frequency. A LAG signal generates an error voltage in the opposite direction. Thus, when a LAG signal is present, current source I3 is turned on for the duration of the LAG signal to charge capacitor C4 in the opposite direction to some value. In this manner, the phase error in the system is minimized to be equivalent to one feedback pulse.

Figure 11:
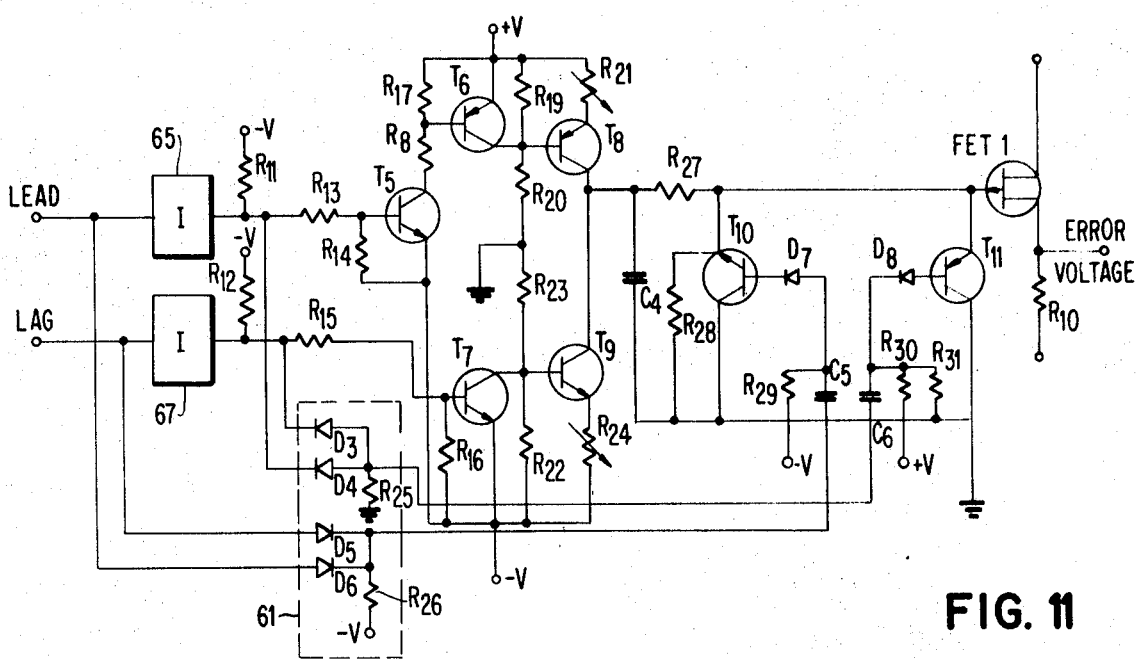
FIG. 11 is a detailed schematic diagram of the error voltage generator.

One implementation of the error voltage generator is shown in FIG. 11. The lead current source switch comprises transistors T5 and T6. Transistor T5 is an NPN transistor having its collector connected by way of series connected resistors R17 and R18 to the positive terminal of a source of regulated voltage. The emitter of transistor T5 is directly connected to the negative terminal of the source of regulated voltage while the base of transistor T5 is connected to the negative terminal by resistor R14. The lead signal from AND gate 53 is inverted by inverter 65 and connected to the base of transistor T5 by resistor R13. Resistor R11 is connected to the negative terminal of the regulated source of voltage and to the output of inverter 65. Transistor T6 is a PNP transistor having its base connected to the positive terminal of the source of regulated voltage. The collector of transistor T6 is connected to the junction of resistors R19, R20 which are connected in series between the positive terminal of the regulated source of voltage and ground, and this common junction of the resistors R19 and R20 and the collector of transistor T6 is connected to the base of PNP transistor T8. Transistor T8 has its emitter connected to the positive terminal of the source of regulated voltage by a variable resistance R21. The collector of transistor T8 is connected to one side of the capacitor C4 and by way of resistor R27 to the emitter of the source follower comprising the field effect transistor FET1.

The switch for the lag current source I3 is similar in construction and includes the NPN transistor T7 which has its emitter directly connected to the negative terminal of the regulated source of voltage. The base of transistor T7 is connected by way of resistor R16 to the negative terminal of the source of voltage and also by way of resistor R15 to an inverter 67 which inverts the output of AND gate 57. A resistor R12 is connected to the negative terminal of the source of regulated voltage and the output of inverter 67. The collector of transistor T7 is connected to the junction of resistors R22 and R23 which are connected in series between the negative terminal of the source of regulated voltage and ground. This common junction of resistors R22 and R23 and the collector of transistor T7 is connected to the base of an NPN transistor T9. Transistor T9 has its emitter connected by way of a variable resistor R24 to the negative terminal of the voltage source and its collector in common with the collector of transistor T8 to one side of capacitor C4.

Under static or no signal conditions, transistor T5 is on, turning transistor T6 on. The saturated collector to emitter voltage $V_{CE}$ of transistor T6 is less than the base to emitter on voltage $V_{BE}$ of transistor T8 and, as a result, transistor T8 is off. Similarly, transistor T7 is on, turning transistor T9 off. When a LEAD signal appears, the leading edge passes through diode D6 which is a part of OR gate 61. The output of diode D6 is connected by way of capacitor C5 and diode D7 to turn on transistor T10. Transistor T10 is a PNP transistor having its emitter connected by way of resistor R27 to the collectors of transistors T8 and T9 in common with one side of capacitor C4. The other side of capacitor C4 is connected to ground as is the collector of transistor T10. Further, the emitter of transistor T10 is connected by resistor R28 to ground. A holdoff bias for transistor T10 is provided by resistor R29 connected between the junction of capacitor C5 and diode D7 and the negative terminal of the source of regulated voltage.

When transistor T10 is turned on, it discharges capacitor C4 to ground. Resistor R27 acts as a discharge current-limiting resistor during this time. Resistor R28 is a gate current resistor.

Since the polarity of the error voltage can be either positive or negative, a complementary discharge path exists. The lead signal is inverted through inverter 65, and a negative transition propagates through diode D4 which is also a part of OR gate 61. The output of OR gate 61 produced by diode D4 propagates through capacitor C6 and diode D8 to turn a PNP transistor T11 on. Transistor T11 has its emitter connected in common with the emitter of transistor T10 and through resistor R27 to capacitor C4. The junction of capacitor C6 and diode D8 is connected by way of resistor R31 to ground. These two resistors R30 and R31 provide the holdoff bias for transistor T11. Diodes D7 and D8 are base-emitter diode protectors for transistors T10 and T11, respectively.

Diodes D5 and D6 have their cathodes connected in common to capacitor C5 and by way of resistor R26 to the negative terminal of the source of regulated voltage. In a similar manner, diodes D3 and D4 have their anodes connected in common to capacitor C6 and by way of resistor R25 to ground. Thus, it may be appreciated that diodes D5 and D6 together with resistor R26 form an OR gate for positive going pulses while diodes D3 and D4 along with resistor R25 form an OR gate for negative going pulses. These two OR gates are combined symbolically as a single OR gate 61.

The discharge of capacitor C4 occurs during the transition only. The duration of the lead signal determines the duration of the charging time of capacitor C4 via transistor T8. Transistor T8 in combination with the variable resistor R21 comprises the current source I2. Disappearance of the lead signal results in a discontinuance of the charging process, and a finite voltage will remain on capacitor C4. The charging rate of capacitor C4 to a positive voltage is determined by the voltage divider comprising resistors R19 and R20 and the emitter resistor R21. Since transistors T8, T10 and T11 will be off, the only discharge current path remaining is through resistor R28 and the gate of source follower transistor FET1.

When a LAG signal appears, the positive transition propagates through diode D5, capacitor C5 and diode D7 to turn transistor T10 on, and the inverted transition goes through diode D3, capacitor C6 and diode D8 to turn transistor T11 on. Both transistors T10 and T11 discharge capacitor C4 to ground. During the duration of the LAG signal, the output of inverter 67 is negative, turning transistor T7 off. With transistor T7 off, transistor T9 begins conducting at a rate determined by the voltage divider comprising resistors R22 and R23 and the emitter resistor R24. Transistor T9 and emitter resistor R24 act as the current source I3. Since transistor T9 is an NPN transistor, the current through it will charge the capacitor C4 negatively. The remainder of the operation is similar to that of the lead input condition.

Figure 12:
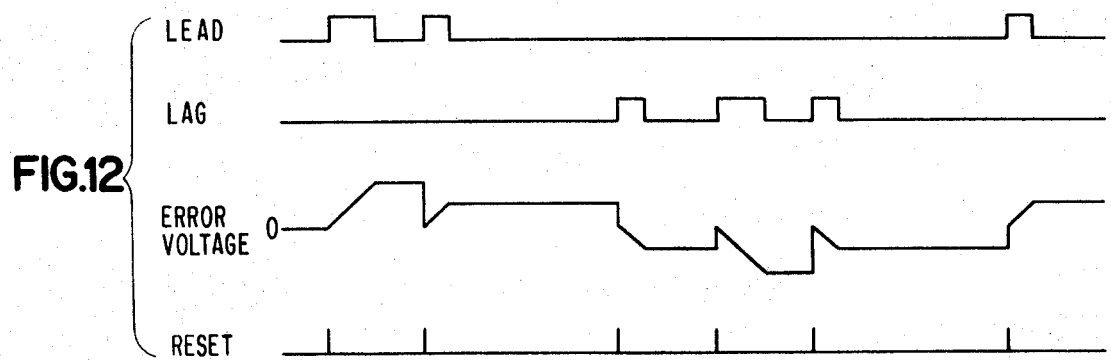
FIG. 12 is a timing diagram illustrating the operation of the error voltage generator shown in FIGS. 10 and 11.

The resultant voltages generated by the error voltage generator are shown in FIG. 12 of the drawings. As illustrated, it is assumed that a lead signal appears first, the leading edge of which produces a reset signal. The capacitor C4 charges during the duration of the first lead pulse to a certain value. The charge on capacitor C4 is held until the next lead signal, the leading edge of which again produces a reset signal. This time, the LEAD signal is of shorter duration, and the capacitor C4 charges to a smaller value than was the case with the first LEAD signal.

At a later time, a LAG signal is produced causing a reset to be generated. The capacitor C4 is charged negatively during the duration of the LAG signal. The capacitor maintains its negative charge until the next LAG signal at which time it is again reset. This second LAG signal has a longer duration so that the capacitor C4 charges to a greater negative value than before. The third LAG signal causes the capacitor to be again reset, or discharged to ground, and the process continues.

From the foregoing description and the accompanying drawings, it will be apparent that the present invention provides improvements in a simple and effective stepping motor drive for accelerating a stepping motor and then maintaining it accurately at a substantially constant speed by varying the frequency of the oscillator. By utilizing closed loop feedback control during acceleration and phase-locked operation to synchronize the motor to the oscillator when the motor has come up to speed, the best features of both types of circuits are obtained.

While the invention has been particularly shown and described with reference to a preferred embodiment thereof, it will be understood by those skilled in the art that various changes in form and detail may be made therein without departing from the spirit and scope of the invention.

What is claimed is:

1. In a control system for a stepping motor having a multitoothed rotor and a stator with a plurality of phase related windings connected to switching means operable to sequentially effect energization of the windings and cause the rotor to advance one step at a time in response to successive pulses applied to the switching means, the improvement comprising:

feedback means including an emitter driven by the motor and operable to produce feedback pulses in response to step advances of the motor, a phase-locked oscillator producing output pulses, digital phase discriminator means connected to receive said feedback pulses and said output pulses of said phase-locked oscillator for generating a binary-coded output signal which is indicative of whether the oscillator output pulses lead or lag the feedback pulses, error voltage generator means responsive to said binary-coded output signal for generating an error voltage, and gating means selectively operable to connect said feedback pulses to said oscillator to reset said oscillator or to connect said error voltage to said oscillator to modulate the oscillator frequency, said gating means also being selectively operable to connect said feedback means or said oscillator to apply pulses therefrom to said switching means to operate the stepping motor.

2. A control system for a stepping motor as recited in claim 1 wherein said gating means includes an Up-to-Speed trigger which is connected to provide a gating signal for said feedback pulses when reset by a start signal, and to provide a gating signal for said error voltage and said oscillator output pulses when set upon the stepping motor attaining running speed.

3. A control system for a stepping motor as defined in claim 2 wherein said phase-locked oscillator comprises:

a unijunction oscillator including a unijunction transistor having its emitter connected to a charging capacitor and to a variable current source responsive to said error voltage for charging said capacitor, and reset means connected across said capacitor for resetting said oscillator in response to a feedback pulse, said reset means comprising a transistor and a diode connected in series, said diode being chosen such that the collector-emitter voltage drop across said transistor when conducting and the voltage drop across said diode are approximately equal to the valley voltage of said unijunction transsitor.

4. A control system for a stepping motor as recited in claim 3 wherein said reset means further comprises:

a first resistor and a differentiating capacitor in series with the base of said transistor and said gating means, and a second resistor connected between the base of said transistor and a return voltage source, said reset means performing a single-shot function to discharge said charging capacitor at the leading edge of a feedback pulse.

5. A control system for a stepping motor as recited in claim 3 further including an Up-to-Speed Detector comprising:

an Up-to-Speed reset single shot receiving feedback pulses from ssid gating means when said Up-to-Speed trigger is reset by a start signal, said single shot producing reset pulses for said phase-locked oscillator, a phase-locked oscillator binary connected to said phase-locked oscillator and dividing said oscillator output pulses by two, said phase locked oscillator binary being reset by said single shot, and an Up-to-Speed pretrigger. connected to be set by said single shot and reset by said phase-locked oscillator binary and controlling said Up-to-Speed trigger to enable a feedback pulse to set said Up-to-Speed trigger when the feedback frequency exceeds the oscillator frequency.

6. A control system for a stepping motor as defined in claim 1 wherein said digital phase detector comprises:

a first AND gate receiving said oscillator pulses, a second AND gate receiving said feedback pulses, and a trigger having a first trigger input connected to receive said feedback pulses and enabled by an oscillator pulse and a second trigger input connected to receive said oscillator pulses and enabled by a feedback pulse, said trigger further having a first output connected to said first AND gate and a second output connected to said second AND gate.

7. A control system for a stepping motor as recited in claim 6 further comprising:

a third AND gate receiving both said oscillator and said feedback pulse, and an inverter connected to apply the inverted output of said third AND gate to said first and second AND gate whereby the output gate width from said first AND gate is proportional to the amount by which the oscillator leads the feedback and the gate width of said second AND gate is proportional to the amount by which the oscillator lags the feedback.

8. A control system for a stepping motor as recited in claim 7 wherein said error voltage generator comprises:

a charging capacitor, first and second gated current sources connected to charge said capacitor to a voltage centered around a reference, said first gated current source being controlled by said first AND gate and said second gated current source being controlled by said second AND gate, and reset means responsive to both said first and second AND gates for resetting said capacitor to said reference at the leading edge of a pulse from either said first or second AND gate.

9. A control system for a stepping motor as recited in claim 8 wherein said error voltage generator further comprises a source follower circuit connected to said capacitor and providing an error voltage output to said phase locked oscillator through said gating means.

UNITED STATES PATENT OFFICE
CERTIFICATE OF CORRECTION

Patent No. 3,601,678      Dated August 24, 1971

Inventor(s)   DENNIS G. ABRAHAM et al

It is certified that error appears in the above-identified patent and that said Letters Patent are hereby corrected as shown below:

Col. 2, line 14 - delete "spped" and substitute "speed"
         line 15 - "pretrigger" should be "pre-trigger"
         line 19 - "pretrigger" should be "pre-trigger"
         line 66 - "multitoothed" should be "multi-toothed"
Col. 3, line 33 - "180" should be "180°"
         line 34 - "4 1." should be "4."
         line 48 - "51a" should be "52a"
         line 53 - "51a" should be "52a"
Col. 4, lines 60-61 - "hol-doff" should be "hold-off"
Col. 5, line 11 - "pretrigger" should be "pre-trigger"
         line 14 - "pretrigger" should be "pre-trigger"
         line 17 - "pretrigger" should be "pre-trigger"
         line 31 - "pretrigger" should be "pre-trigger"
         line 35 - insert a comma (,) after "binary"
         line 60 - "Signal" should be "signal"
Col. 7, line 23 - "field effect" should be "field-effect"
         lines 55-56 - "hol-doff" should be "hold-off"
Col. 8, lines 72-73 - "multitoothed" should be "multi-toothed"
Col. 10, line 8 - "pretrigger" should be "pre-trigger"
         line 8 - delete period (.) after "pretrigger"

Signed and sealed this 18th day of April 1972.

(SEAL)
Attest:

EDWARD M. FLETCHER, JR.      ROBERT GOTTSCHALK
Attesting Officer              Commissioner of Patents